United States Patent [19]

Goldstein

[11] Patent Number: 4,808,495

[45] Date of Patent: Feb. 28, 1989

[54] SHOCK-PROTECTED BATTERY COVER ASSEMBLY

[75] Inventor: Richard Goldstein, Northbrook, Ill.

[73] Assignee: Perma Power Electronics, Inc., Chicago, Ill.

[21] Appl. No.: 118,454

[22] Filed: Nov. 9, 1987

[51] Int. Cl.[4] .............................................. H01M 2/04
[52] U.S. Cl. .................................... 429/175; 429/177; 429/178
[58] Field of Search ................ 429/175, 177, 163, 178

[56] References Cited

U.S. PATENT DOCUMENTS 3,961,988  6/1976  Andreoff .............................. 429/175
4,444,853  4/1984  Halsall et al. .................... 429/177 X Primary Examiner—Anthony Skapars
Attorney, Agent, or Firm—Wallenstein, Wagner, Hattis & Strampel, Ltd.

[57] ABSTRACT

An insulating battery cover is configured to be locked into place by insertion of either one of a pair of connectors making contact with the battery. The cover is designed for use with batteries having insertion-type terminals configured to accept inserted connectors. A pair of shell-forming projections are provided integral with the housing and configured to accommodate the battery terminals when the cover is in place. An aperture in each projection is configured to allow insertion of the associated connector. Portions of the cover local to the projections are provided, and arrestingly engage exterior insulating portions of the connectors to hinder removal of the cover unless both connectors have been removed.

11 Claims, 1 Drawing Sheet

SHOCK-PROTECTED BATTERY COVER ASSEMBLY

DESCRIPTION

1. Technical Field

The technical field of the invention is the battery art, and in particular protective insulated battery covers.

2. Background Art

Various types of electrical equipment powered from electrical power lines contain a storage battery therein. One well-known form of such system is a standby power supply, which automatically cuts in a battery-operated inverter to supply electrical power to an associated load whenever the power line voltage fails. Such systems typically have integral battery chargers which maintain the storage battery in a continuous floating condition during normal power line operation.

As may be the case in such supplies, if the high voltage and return lines of the household wiring are improperly connected, both terminals of the storage battery may be at a dangerous AC potential with respect to ground. Accordingly, a hazardous situation can occur attendant to battery replacement if the operator fails to disconnect the inverter from the power lines prior to such operation. In the event that he should remove only one connector from the battery and then accidentally contact that battery terminal while removing the other connector, serious and possibly fatal electrical shock may result. There is a need for an inexpensive solution to this problem, since product liability insurers will frequently refer to insure retailers who sell hazardous electrical equipment.

SUMMARY OF THE INVENTION

According to a feature of the invention, an insulating battery cover is configured to accept insertion of a pair of connectors making electrical contact to the battery. The cover is designed for use with batteries having insertion-type terminals configured to accept inserted connectors. A pair of shell-forming projections are provided integral with the housing and are configured to accommodate the battery terminals when the cover is in place. An aperture in each projection is configured to allow such insertion of the associated connector. Portions of the cover local to the projections are disposed to confront and thus upon cover removal to engage exterior insulating portions of the connectors to hinder removal of the cover unless both connectors have been removed. According to a related feature of the invention, the flexible leads to the connectors are anchored to the cover in such a way that even if the cover is forcibly removed against the hindering obstruction of the connectors, lead tension will cause disconnection of the connectors of the battery terminals attendant to cover removal.

Thus, the battery terminals are not exposed for accidental contact by the operator until the connectors have been completely removed, thereby removing the aforementioned shock hazard. In the preferred form of the invention there is provided a hold-down member, most preferably in the form of a bar, which is placed upon the cover and which is engageable with chassis-mounted hold-down bolts. This bar presses down on the cover to hold it securely in place over the terminal-bearing upper face of the battery. According to a related feature of the invention, this bar may be made integral with, or otherwise permanently affixed to the top cover so that engaged connectors hinder removal of the hold-down bar as well.

BRIEF DESCRIPTION OF DRAWINGS

FIG. 4 is a perspective view of the electrical connector assembly attached to a terminal lead.

DETAILED DESCRIPTION

Figure 1:
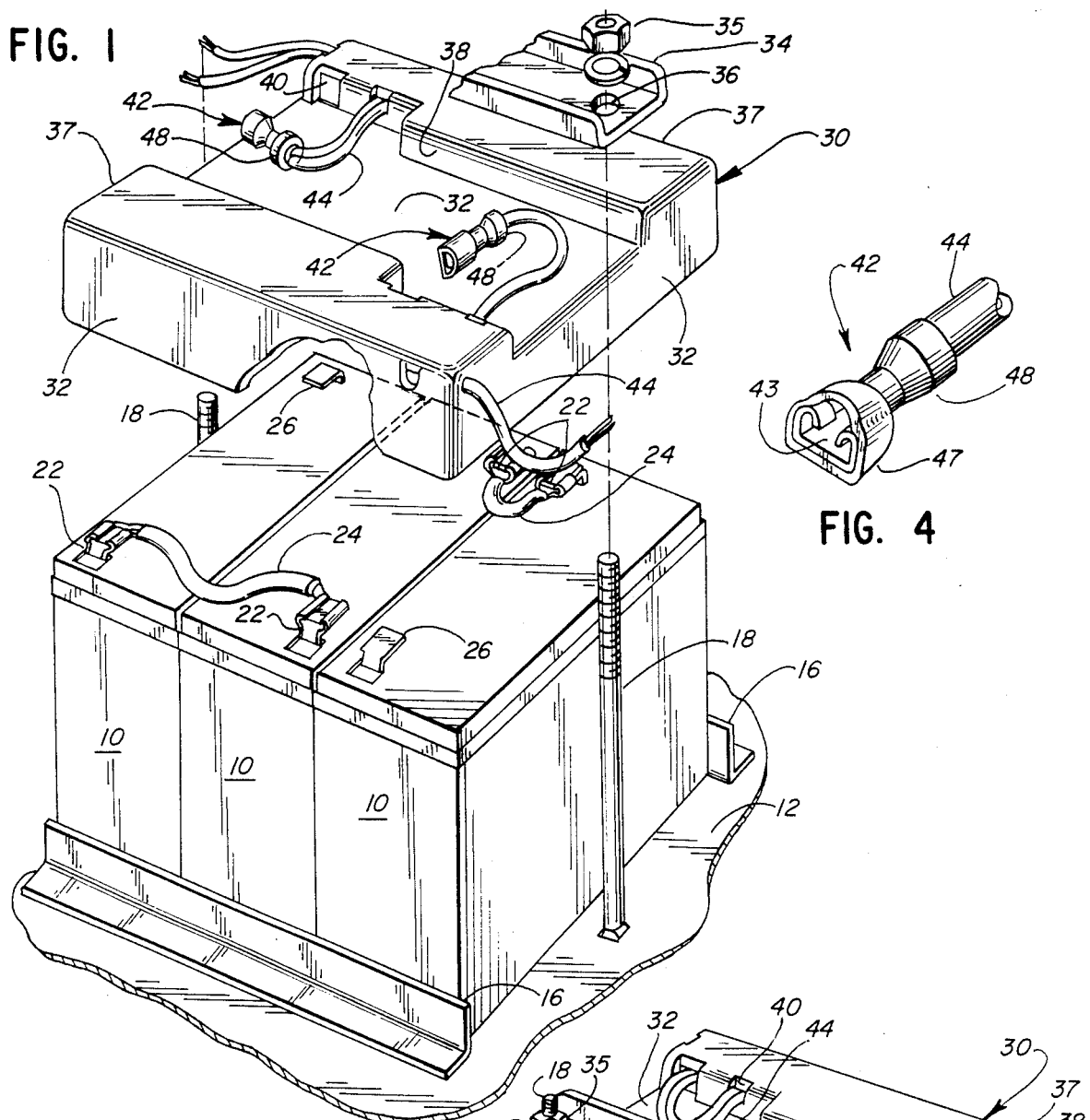
FIG. 1 is an exploded perspective view showing the battery cover of the invention disposed for drop-on assembly with a multi-cell battery; and further showing the principal elements of a battery hold-down system.

While this invention is susceptible of embodiment in many different forms, there is shown in the drawings and will herein be described in detail a preferred embodiment of the invention with the understanding that the present disclosure is to be considered as an exemplification of the principles of the invention, and is not intended to limit the broad aspect of the invention to the embodiment illustrated.

Referring now to the Figures, the instant invention is shown as applied to a group of three cells 10 having their bases nestingly mounted into a base plate 12 having ribs 16 upstanding therefrom to secure the cells against lateral movement. A pair of upstanding bolts 18 extend upward from the base plate 12. In the particular example shown, the three cells 10 have four interior terminals 22 interconnected by intermediate wiring 24 to connect them in series. A pair of output terminals 26 provide battery voltage to the associated load.

A insulated battery cover 30 is provided having a generally planar central face portion 32 configured to lie in contacting engagement with the central portions of the three cells 10, and further has downwardly-extending rim portions 32 configured for engagement with the outer periphery of the tops of the cells 10. A hold-down 34 rail having holes 36 at the ends thereof is placed over the upstanding ends of the bolts 18 and is captively secured by nuts 35 to secure the cell assembly to the base plate 12.

Figure 3:
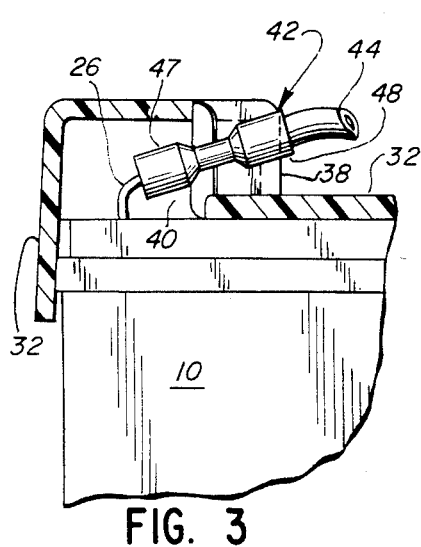
FIG. 3 is a partial cross section view of a battery connector inserted through an aperture in the battery cover to make contact to a battery terminal.
Figure 2:
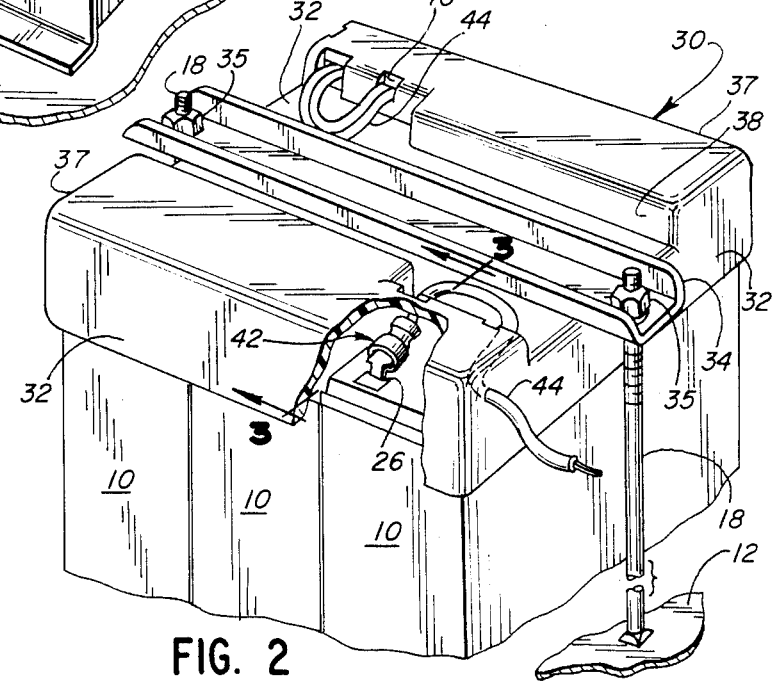
FIG. 2 is a perspective view showing the battery cover secured in place.

The major edges of the cover 30 are provided with integral extension shells 37 which extend upward beyond the central portion 32 of the cover 30 so as to accommodate the output terminals 26, the intermediate terminals 22 and the intermediate wiring 24. At the opposite ends of the intermediate faces 38 of the extension shells 37 there are access holes 40 providing access to the two output terminals 26. A pair of connector assemblies 43 are provided, each assembly having a conducting connector 42 attached to an associated lead 44 and configured for sliding insertion engagement with its associated output terminal 26 (See FIG. 3).

In the embodiment shown, the extension shells 37 are provided with tightly fitting holes through which the leads 44 are threadingly passed to be captively secured to the cover 30. This effectively secures each assembly 42 on a short lead length to the cover 30. Each connector assembly 42 further has an insulating body shell 47 configured to cover the conducting portion of the connector 42, and further has a body extension portion 48 extending along a short portion of its associated lead 44. It will be noted that when the connectors 42 are inserted to engage their associated output terminals 26, the insulated portions of each connector assembly 42, and in particular their body extension portions 48, are disposed to confront a portion of the cover top surface 32 so as to arrestingly hinder removal of the cover 30 unless both of the connector assemblies 42 have been withdrawn. Furthermore, by captively securing the connector leads 44 to the housing 30 so as to leave only sufficient length to allow restricted movement of the captive portion of these terminal leads, even in the event that the operator succeeds in forcing the cover 30 upward against the restraining action of the connector assemblies 42, these connectors will be pulled loose from the battery terminals 26 so as to remove them from electrical connection to the system. The possibility thus of accidentally contacting one of the battery terminals 26 while one of the connector assemblies 42 is still in place is thus eliminated.

A greater many variants on the foregoing are possible without departing from the scope of the instant invention. Thus, for example, the hold-down rail 34 may be integral with or rigidly secured to the cover 30. In such a case, the connectors 42 must be removed before the hold-down rail 34 may be removed, thereby carrying the cover with it at that time. Such a cover combination would constitute a hold-down assembly, and would in its simplest form merely require that it have rigid portions extending immediately under the connector body extensions 48—48 to achieve the minimum requirement of forcing the operator to remove the connectors before the hold-down assembly could be removed; however, the completely-enclosing cover 30, as shown in the Figures, is the preferred form of this latter version of the invention from a safety standpoint.

While particular embodiments of the invention have been shown and described, it will be obvious to those skilled in the art that various changes and modifications may be made without departing from the present invention in its broader aspect.

I claim:

1. A battery cover assembly for a battery of given dimensions and having a pair of battery output terminals disposed adjacent to a given face thereof, said assembly comprising:
   an insulated battery cover configured to nestingly engage at least a portion of said given battery face;
   a pair of lead-carrying electrical power connectors having insulating bodies with electrically-conducting tip portions therein configured for engagement with said terminals, said cover being provided with apertures configured to insertingly accept said tip portions of said power connectors for connection to said terminals, said cover including arresting means responsive to engagement of said power connectors to said terminals for obstructingly hindering removal of said battery cover.

2. The battery cover assembly of claim 1 further including said battery.

3. The battery cover assembly of claims 1 or 2 wherein said cover is provided with at least one outwardly extending shell-forming projection portion configured to enclosingly accommodate said power terminals therein.

4. The battery cover of claim 3 wherein said battery comprises a plurality of cells having intermediate terminals adjacent said given battery face, said given battery face is generally rectangular, said terminals are disposed in two rows along parallel opposite edges of said given battery face, and said cover is provided with a pair of said projection portions configured as generally rectangular hollow shells disposed to enclosingly extend along said rows of terminals.

5. The battery cover of claim 1 further including means for attaching said leads to said cover so as to be moved therewith and wherein said power connectors are provided with releasing means for releasing contact with their associated terminals responsively to a given tension applied thereto, the free lengths of said leads between said power connectors and said lead attachment means being chosen so that during removal of said cover with said power connectors engaged to said terminals said leads will stressingly urge said power connectors to disengage from their associated terminals.

6. The battery cover of claim 5 further including skirt portions configured to surround portions of the sides of said battery adjacent said terminal-bearing face thereof, the free length of said leads between said power connectors and said lead attachment means being chosen so that during removal of said cover with said power connectors engaged to said terminals said leads will stressingly urge said power connectors to disengage from said terminal before said skirt portions are withdrawn from a surrounding relationship with respect to portions of said sides of said battery.

7. The battery cover of claim 3 further including means for attaching said leads to said cover so as to be moved therewith and wherein said power connectors are provided with releasing means for releasing contact with their associated terminals responsively to a given tension applied thereto, the free lengths of said leads between said power connectors and said lead attachment means being chosen so that during removal of said cover with said power connectors engaged to said terminals said leads will stressingly urge said power connectors to disengage from their associated terminals.

8. The battery cover of claim 7 further including skirt portions configured to surround portions of the sides of said battery adjacent said terminal-bearing face thereof, the free length of said leads between said power connectors and said lead attachment means being chosen so that during removal of said cover with said power connectors engaged to siid terminals said leads will stressingly urge said power connectors to disengage from said terminal before said skirt portions are withdrawn from a surrounding relationship with respect to portions of said sides of said battery.

9. In combination:
   a battery having a plurality of electrical terminals disposed adjacent to a given face thereof and adapted for engagement with a plurality of electrical connectors adapted for connection to a battery-powered electrical system;
   at least two lead-carrying electrical power connectors, each connector having an electrically conducting tip portion configured for engagement with one of said terminals and an insulating body portion surrounding said tip portion;
   hold-down means configured for engagement with said given face and having rigid portions configured to extend to regions adjacent said terminals and to b disposed between said given face and said connector body portions to confront said body portions when said connectors are inserted into said terminals so that said insulated connectors obstructively hinder removal of said hold-down means; and securing means for securing said hold-down means to a mounting base for said apparatus with said hold-down assembly so engaged with said given face.

10. The combination of claim 9 wherein said hold-down means includes insulating portions configured to generally shieldingly surround said terminals and having apertures in said insulating portions configured to accept passage of said tip portions of said connectors for engagement with said terminals.

11. The combination of claim 10 wherein said securing means includes a plurality of holes provided in said hold-down means and configured to allow passage therethrough of a corresponding plurality of base-mountable bolts.

* * * * *